US012803205B2

(12) United States Patent
Wang et al.

(10) Patent No.: US 12,803,205 B2
(45) Date of Patent: Nov. 17, 2026

(54) PLUG-IN TERMINAL, PLUG-IN STRUCTURE AND MOTOR VEHICLE

(71) Applicant: Changchun Jetty Automotive Technology Co., Ltd., Changchun (CN)

(72) Inventors: Chao Wang, Changchun (CN); Chuan Liu, Changchun (CN)

(73) Assignee: Changchun Jetty Automotive Technology Co., Ltd., Changchun (CN)

(*) Notice: Subject to any disclaimer, the term of this patent is extended or adjusted under 35 U.S.C. 154(b) by 332 days.

(21) Appl. No.: 18/684,169

(22) PCT Filed: Aug. 8, 2022

(86) PCT No.: PCT/CN2022/110786
§ 371 (c)(1),
(2) Date: Feb. 15, 2024

(87) PCT Pub. No.: WO2023/020312
PCT Pub. Date: Feb. 23, 2023

(65) Prior Publication Data

US 2025/0286298 A1 Sep. 11, 2025

(30) Foreign Application Priority Data

Aug. 17, 2021 (CN) ........................ 202110944154.6

(51) Int. Cl.
*H01R 13/03* (2006.01)
*H01R 13/11* (2006.01)

(52) U.S. Cl.
CPC ........... *H01R 13/113* (2013.01); *H01R 13/03* (2013.01); *H01R 2201/26* (2013.01)

(58) Field of Classification Search
None
See application file for complete search history.

(56) References Cited

U.S. PATENT DOCUMENTS 5,004,426 A * 4/1991 Barnett ................ H01R 13/112
439/82
5,217,382 A 6/1993 Sparks
(Continued)

FOREIGN PATENT DOCUMENTS

CN 1110015 A 10/1995
CN 1832266 A 9/2006
(Continued)

OTHER PUBLICATIONS

First Office Action and Search Report issued on Apr. 14, 2025, for counterpart Chinese Patent Application No. 202110944154.6.
(Continued)

*Primary Examiner* — Tho D Ta
(74) *Attorney, Agent, or Firm* — Renner, Otto, Boisselle & Sklar, LLP

(57) ABSTRACT

The present disclosure provides a plug-in terminal, a plug-in structure, and a motor vehicle. The plug-in terminal includes a terminal lamination, the terminal lamination includes at least two connection arms, each of the connection arms includes an overhanging end and a fixed end, the fixed ends of the connection arms are fixedly connected together, and a plugging groove is disposed between adjacent two of the connection arms; and the overhanging end is provided with a conductive contact portion. The present disclosure alleviates the technical problem that a failure of an electrical connection is likely to occur when a clamping terminal is subjected to an external force or a long-term plug vibration.

18 Claims, 4 Drawing Sheets

(56) References Cited

U.S. PATENT DOCUMENTS

| | | | | |
|---|---|---|---|---|
| 5,554,056 | A | 9/1996 | Henricus op ten Berg | |
| 6,508,656 | B2 * | 1/2003 | Chevassus-More | H02B 11/04 439/721 |
| 6,974,329 | B2 * | 12/2005 | Henneberg | H01R 12/585 439/59 |
| 7,168,990 | B2 * | 1/2007 | Suzuki | H01R 13/112 439/267 |
| 9,819,109 | B2 * | 11/2017 | Duan | H01R 4/028 |
| 10,476,191 | B2 * | 11/2019 | Venaleck | H01R 12/91 |
| 2005/0245144 | A1 | 11/2005 | Hegel | |
| 2007/0004291 | A1 | 1/2007 | Bogiel et al. | |
| 2015/0047879 | A1 | 2/2015 | Shibuya et al. | |
| 2015/0050829 | A1 * | 2/2015 | Wimmer | H01R 13/02 439/395 |

FOREIGN PATENT DOCUMENTS

| | | | | | |
|---|---|---|---|---|---|
| CN | 202134663 | U | | 2/2012 | |
| CN | 104246015 | A | | 12/2014 | |
| CN | 104716783 | A | | 6/2015 | |
| CN | 205178083 | U | | 4/2016 | |
| CN | 205194972 | U | | 4/2016 | |
| CN | 105814746 | A | * | 7/2016 | C25D 5/10 |
| CN | 105981231 | A | | 8/2019 | |
| CN | 210692819 | U | * | 6/2020 | |
| CN | 112072356 | A | * | 12/2020 | H01R 13/10 |
| CN | 112670763 | A | * | 4/2021 | |
| CN | 212874836 | U | * | 4/2021 | |
| CN | 113571934 | A | | 10/2021 | |
| CN | 113571943 | A | | 10/2021 | |
| CN | 113922123 | A | | 1/2022 | |
| CN | 215816489 | U | | 2/2022 | |
| CN | 217215185 | U | | 8/2022 | |
| CN | 217215197 | U | | 8/2022 | |
| JP | H1185827 | A | | 3/1999 | |
| JP | 2005294220 | A | | 10/2005 | |
| JP | 2010531530 | A | | 9/2010 | |
| JP | 2011028933 | A | | 2/2011 | |
| JP | 2013539728 | A | | 10/2013 | |
| JP | 2018010801 | A | | 1/2018 | |
| JP | 2018156771 | A | | 10/2018 | |
| JP | 2020027799 | A | | 2/2020 | |

OTHER PUBLICATIONS

Second Office Action issued for corresponding Japanese Patent Application 2024-509438 mailed on Jun. 24, 2025 and its English translation.

The Second Office Action issued on Aug. 2, 2025 for counterpart Chinese patent application No. 202110944154.6 and its English machine translation.

International Search Report mailed Nov. 14, 2022, for International Application No. PCT/CN2022/110786.

Extended European Search Report dated Dec. 18, 2024, for European Application No. 22857624.5.

Notice of Reasons for Refusal mailed Feb. 18, 2025, for Japanese Application No. 2024-509438.

Decision of Rejection and Supplementary search report issued on Oct. 27, 2025 for counterpart Chinese patent Application No. 202110944154.6, and its English translation.

Third Office Action issued for corresponding Japanese Patent Application 2024-509438 mailed on Nov. 25, 2025 and its English translation.

* cited by examiner

PLUG-IN TERMINAL, PLUG-IN STRUCTURE AND MOTOR VEHICLE

CROSS-REFERENCE TO RELATED APPLICATION

The present disclosure is a National Stage of International Application No. PCT/CN2022/110786 filed on Aug. 8, 2022, which claims priority to Chinese Patent Application NO. 202110944154.6, entitled 'plug-in terminal, plug-in structure and motor vehicle' and filed on Aug. 17, 2021, both of which are hereby incorporated by reference in their entireties.

TECHNICAL FIELD

The present disclosure relates to the technical field of electrical connection elements, and particularly to a plug terminal, a plug structure and a motor vehicle.

BACKGROUND

The sheet-shaped terminal and the clamping terminal are conventional conductive elements for plugging. The clamping terminal is clamped by the elasticity of a metal plate, and when being subjected to an external force or a long-term plugging vibration, the metal plate is easily deformed or its elasticity is weakened, so that an electrical connection is failed and the function of the electrical apparatus cannot be realized.

Therefore, in the technical field of electrical connection elements, there is an urgent need for a plug-in terminal that is stable during connection and does not cause a failure of an electrical connection even when a clamping terminal is subjected to an external force or a long-term plugging vibration.

SUMMARY

An objective of the present disclosure is to provide a plug-in terminal, a plug-in structure, and a motor vehicle, so as to alleviate the technical problem that a failure of an electrical connection is likely to occur when a clamping terminal is subjected to an external force or a long-term plugging vibration.

The above objective of the present disclosure can be achieved by the following technical solutions:

The present disclosure provides a plug-in terminal, including a terminal lamination. The terminal lamination includes at least two connection arms, each of the connection arms includes an overhanging end and a fixed end, and the fixed ends of the connection arms are fixedly connected together. A plugging groove is disposed between adjacent two of the connection arms. The overhanging end is provided with a conductive contact portion.

The present disclosure provides a plug-in structure, including the aforementioned plug-in terminal and a mating plug-in terminal plugged therewith.

The present disclosure provides a motor vehicle, including the aforementioned plug-in terminal.

The present disclosure provides a motor vehicle, including the aforementioned plug-in structure.

The present disclosure has the following characteristics and advantages:

The mating plug-in terminal may be plugged and matched with the plug-in terminal, and in the plug-in terminal, connection arms of the plurality of terminal laminations are stacked, so that the mating plug-in terminal can be plugged into the plugging groove, and the problems of deformation and elasticity weakening caused by the excessively thick metal plate can be alleviated by the structure of the connection arms. The conductive contact portion is in in contact with and electrically connected to the connection arm; the mating plug-in terminal is tightly clamped by the connection arm, and fixed with the plug-in terminal together with a larger contact area therebetween, thereby ensuring the connection reliability and the electrical conduction effect. The plug-in terminal can ensure a stable clamping structure, reduce the deformation and increase the strength of the connection arm.

BRIEF DESCRIPTION OF THE DRAWINGS

The following drawings are only for schematic illustration and explanation of the present disclosure, rather than limiting the scope thereof. In the drawings.

DESCRIPTION OF EMBODIMENTS

In order to have a clearer understanding of the technical features, objectives and effects of the present disclosure, specific embodiments of the present disclosure will be illustrated below with reference to the drawings. In the description of the present disclosure, unless otherwise specified, 'a plurality of' means two or more.

Solution 1

Figure 1:
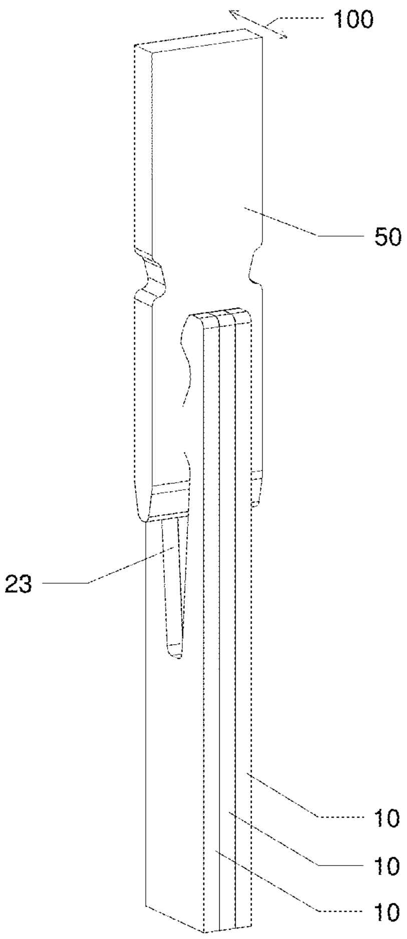
FIG. 1 illustrates a schematic diagram of plugging between a plug-in terminal and a mating plug-in terminal according to an embodiment of the present disclosure.
Figure 2:
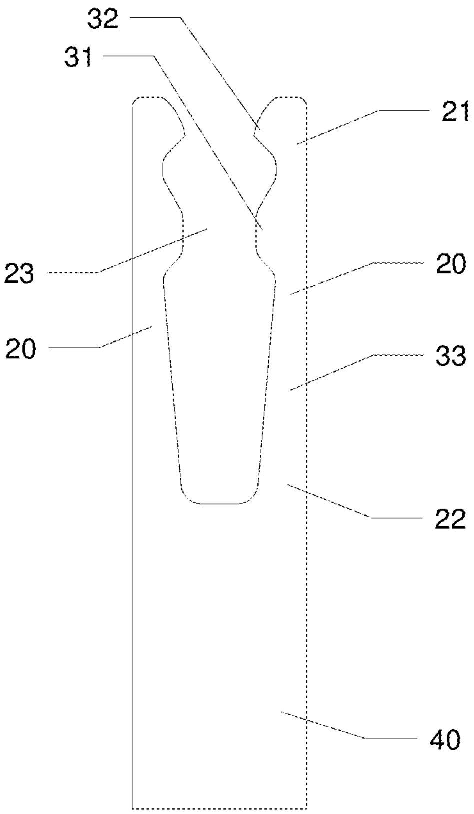
FIG. 2 illustrates a front view of a plug-in terminal according to the present disclosure.

The present disclosure provides a plug-in terminal, as illustrated in FIGS. 1 and 2, including a terminal lamination 10 which includes at least two connection arms 20. Each of the connection arms 20 includes an overhanging end 21 and a fixed end 22, and the fixed end 22 of each connection arm 20 is fixedly connected together. A plugging groove 23 is disposed between adjacent two of the connection arms 20. Each of the connection arm 20 is provided with conductive contact portions 31.

In an embodiment, the conductive contact portions 31 are disposed inside the plugging groove 23, the mating plug-in terminal 50 may be plugged and matched with the plug-in terminal, and the mating plug-in terminal 50 is capable of being plugged into the plugging groove 23. During plugging, the conductive contact portions 31 are in contact with the mating plug-in terminal 50 to realize an electrical connection, thereby ensuring the connection reliability and the electrical conduction effect.

Optionally, the conductive contact portion 31 is disposed on two sides inside the plugging groove 23, and is capable of being in contact with two sides of the mating plug-in terminal 50 respectively to realize electrical connection and increase a contact area to achieve a better electrical conduction effect.

Optionally, the conductive contact portions 31 are symmetrically disposed on two sides inside the plugging groove 23. In order to enable the conductive contact portions 31 to better clamp the mating plug-in terminal 50, the opposite conductive contact portions 31 are symmetrically disposed inside the plugging groove 23 to achieve a balanced stress and a better clamping effect.

In an embodiment, the mating plug-in terminal 50 may be plugged and matched with the plug-in terminal, and the plug-in terminal includes a plurality of terminal laminations 10 which are stacked. The mating plug-in terminal 50 is capable of being plugged into the plugging groove 23, and the conductive contact portions 31 are in contact with and electrically connected to the connection arm 20. The mating plug-in terminal 50 is tightly clamped by the connection arm 20, and fixed with the plug-in terminal together with a larger contact area therebetween, thereby ensuring the connection reliability and the electrical conduction effect. The plug-in terminal can ensure a stable clamping structure, reduce the deformation and increase the strength of the connection arm 20.

In an embodiment, the terminal laminations 10 are formed as sheets by punching a plate or cutting a plate, and are stacked so that the plug-in terminal has a high mechanical connection performance, while ensuring the conductive connection performance between the plug-in terminal and the mating plug-in terminal 50. The processing mode of punching a plate or cutting the plate is simple and the process is mature, so that the terminal laminations 10 can be processed rapidly in large batches, thereby saving the processing cost and improving the production efficiency.

The mating plug-in terminal 50 matched with the plug-in terminal may be sheets or boards. The clamping force is controlled by adjusting the width of the connection arm 20 or the number of the terminal laminations 10, so as to adapt to the mating plug-in terminal 50 and meet various plugging requirements. Through the connection arms 20 with different sizes, it is possible to adapt to the mating plug-in terminals 50 with different shapes.

As illustrated in FIG. 2, the terminal lamination 10 includes two connection arms 20 with a plugging groove 23 formed therebetween, and the mating plug-in terminal 50 is capable of being plugged into the plugging groove 23. The terminal lamination 10 may include two or more connection arms 20, the terminal lamination 10 includes a plurality of plugging grooves 23, and a plurality of mating plug-in terminals 50 are plugged and matched with the plug-in terminal simultaneously.

In an embodiment, the terminal lamination 10 includes a terminal fixing portion 40 to which the fixed end 22 of each connection arm 20 is fixedly connected, and the connection arm 20 is connected to a cable through the terminal fixing portion 40, thereby ensuring the stability of the electrical connection.

In an embodiment, the terminal fixing portions 40 of adjacent two of the terminal laminations 10 are connected together by crimping connection, welding connection, threaded connection or rivet connection.

The crimping connection is a production process in which the adjacent terminal fixing portions 40 are assembled and then stamped into a whole by a crimping machine. The crimping connection is advantageous in mass production, and by using an automatic crimping machine, products with stable qualities can be manufactured rapidly in large quantities.

The welding connection fuses the adjacent terminal fixing portions 40 into a whole through metal melting points by friction welding, resistance welding, ultrasonic welding, arc welding, pressure welding, laser welding, explosion welding, etc., so that the connection is firm and the contact resistance is small.

The threaded connection means that the adjacent terminal fixing portions 40 both have threaded structures, which are capable of being threaded together or connected together by using separate studs and nuts. The threaded connection has the advantage of detachability, i.e., assembling and detaching can be repeated, which is suitable for scenarios that require frequent detaching.

The rivet connection adopts rivets to rivet the adjacent terminal fixing portions 40 together. The rivet connection has the advantages of firm connection, simple processing method and easy operation.

The structure of the terminal fixing portion 40 is not limited to one form. A first form is that the terminal fixing portion 40 is integrally formed, and the fixed end 22 of each of the connection arm 20 is fixedly connected to the terminal fixing portion 40. A second form is that the terminal fixing portion 40 is a part of the connection arm 20 and integrated therewith, while the plurality of terminal fixing portions 40 in the plug-in terminal are stacked.

In an embodiment, the connection arms 20 of adjacent two of the terminal laminations 10 are in contact fit to slide relative to each other, so that each of the terminal laminations 10 is capable of maintaining its own clamping force, and the connection stability can be improved owing to the uneven surface of the plug-in terminal.

When the mating plug-in terminal 50 is plugged into the plugging groove 23, the connection arm 20 may be elastically deformed to tightly clamp the mating plug-in terminal 50 by an elastic force. Further, the connection arm 20 includes a deformation portion 33, and the conductive contact portion 31 and the deformation portion 33 are sequentially disposed in a direction from the overhanging end 21 to the fixed end 22. An inner wall of the deformation portion 33 is inclined inward in the direction from the overhanging end 21 to the fixed end 22, so as to promote the deformation of the connection arm 20, facilitate the plugging and unplugging of the mating plug-in terminal 50, and enhance the strength of clamping of the mating plug-in terminal 50. The overhanging end 21 of the connection arm 20 is chamfered or rounded to facilitate the plugging and matching with the mating plug-in terminal 50.

In an embodiment, the connection arm 20 is provided with a scraping portion 32. As illustrated in FIG. 2, the scraping portion 32 and the conductive contact portion 31 are sequentially disposed in the direction from the overhanging end 21 to the fixed end 22. In a process of plugging the mating plug-in terminal 50 into the plugging groove 23, the scraping portion 32 can scrape the foreign matter or oxide on the surface of the mating plug-in terminal 50 to expose a conductive surface of the mating plug-in terminal 50, thereby improving the electrical performance.

Further, the scraping portion 32 is disposed to extend in a thickness direction 100 of the terminal lamination 10. In a process of plugging of the mating plug-in terminal 50 into the plugging groove 23, a movement direction of the mating plug-in terminal 50 is perpendicular to an extending direction of the scraping portion 32, which is beneficial to scraping the mating plug-in terminal 50 by the scraping portion 32. The scraping portion 32 has a triangular cross-section which enhances the scraping effect.

In an embodiment, a highest point of the scraping portion 32 relative to the overhanging end 21 is not higher than a highest point of the conductive contact portion 31 relative to the overhanging end 21. When the mating plug-in terminal 50 is plugged into the plugging groove 23, since the scraping portion 32 and the conductive contact portion 31 are sequentially disposed in the direction from the overhanging end 21 to the fixed end 22, the scraping portion 32 contacts the mating plug-in terminal 50 firstly, and then the conductive contact portion 31 contacts the mating plug-in terminal 50. If the highest point of the scraping portion 32 relative to the overhanging end 21 is higher than the highest point of the conductive contact portion 31 relative to the overhanging end 21, the highest point of the overhanging end 21 is the highest point of the scraping portion 32, so that the conductive contact portion 31 cannot contact the mating plug-in terminal 50 and it is impossible to achieve current conduction. Since the contact area between the scraping portion 32 and the mating plug-in terminal 50 is much less than that between the conductive contact portion 31 and the mating plug-in terminal 50, the contact resistance between the plug-in terminal and the mating plug-in terminal 50 increases sharply, and the conduction current also increases, resulting in a temperature rise of the contact point, and in severe cases, the plug-in structure may be burnt down to cause serious consequences. Therefore, the highest point of the scraping portion 32 relative to the overhanging end 21 is not higher than the highest point of the conductive contact portion 31 relative to the overhanging end 21.

In an embodiment, a length of the scraping portion 32 in the direction from the overhanging end 21 to the fixed end 22 accounts for 3% to 55% of a length of the overhanging end 21. The scraping portion 32 is capable of scraping the foreign matter or oxide on the surface of the mating plug-in terminal 50, but it is not able to play a main role of conducting current, and it is the conductive contact section 31 that plays a main role of conducting current. As a ratio of the length of the scraping portion 32 to the length of the overhanging end 21 increases, a ratio of a length of the conductive contact portion 31 to the length of the overhanging end 21 decreases, and it is impossible to achieve a good current conduction. In addition, if the ratio of the length of the scraping portion 32 to the length of the overhanging end 21 is too small, a force-bearing part of the scraping portion 32 will be very small, and the scraping portion 32 will be deformed due to the influence of the plugging force and the friction force after many times of mating plugging, and it is impossible to remove the foreign matter or oxide on the surface of the mating plug-in terminal 50.

In order to verify the influence of the ratio of the length of the scraping portion 32 in the direction from the overhanging end 21 to the fixed end 22 to the length of the overhanging end 21, on the electrical conductivity and the number of times of deformations of the plug-in structure, the inventor selects the same mating plug-in terminal 50, adopts the plug-in terminals with different ratios of the length of the scraping portion 32 to the length of the overhanging end 21, plugs the mating plug-in terminal 50 with the plug-in terminal, and after the plug-in structure is electrified, detects the electrical conductivity of a corresponding plugging position. The mating plug-in terminal 50 and the plug-in terminal are subjected to 1000 times of plugging, and the deformation of the scraping portion 32 is observed every 10 times of plugging. If the scraping portion 32 is deformed, the experiment is stopped and then the number of times of plugging at that time is recorded. The test results are shown in Table 1.

In this embodiment, the electrical conductivity greater than 99% is an ideal value. If the number of times of plugging when the scraping portion 32 is deformed is less than 800 times, it is considered as unqualified.

TABLE 1

Influences of Different Ratios of the Length of the Scraping Portion 32 to the Length of the Overhanging End 21 on the Electrical Conductivity

| Ratio of the length of scraping portion 32 to the length of overhanging end 21 (%) | | | | | | | | | | | |
|---|---|---|---|---|---|---|---|---|---|---|---|
| 1 | 3 | 5 | 15 | 25 | 35 | 45 | 55 | 65 | 75 | 85 | 95 |
| Electrical conductivity of the plug-in structure (%) | | | | | | | | | | | |
| 99.7 | 99.8 | 99.8 | 99.9 | 99.9 | 99.9 | 99.6 | 99.3 | 98.8 | 98.6 | 98.4 | 98.3 |
| Number of times of plugging when the scraping portion 32 is deformed | | | | | | | | | | | |
| 770 | 830 | 960 | 1000 | 1000 | 1000 | 1000 | 1000 | 1000 | 1000 | 1000 | 1000 |

As can be seen from the above table, when the ratio of the length of the scraping portion 32 to the length of the overhanging end 21 is less than 3%, the electrical conductivity of the plug-in structure is qualified, but the number of times of plugging when the scraping portion 32 is deformed is less than a qualified value. However, when the ratio of the length of the scraping portion 32 to the length of the overhanging end 21 is greater than 55%, the electrical conductivity of the plug-in structure is less than the qualified value since the conductive contact portion 31 has a small ratio. Therefore, considering comprehensively, the inventor sets the length of the scraping portion 32 along the direction from the overhanging end 21 to the fixed end 22 to be 3% to 55% of the length of the overhanging end 21.

In an embodiment, as illustrated in FIG. 2, the conductive contact portion 31 is disposed to extend in the thickness direction 100 of the terminal lamination 10, and the cross-section of the conductive contact portion 31 is arc-shaped, trapezoidal or corrugated, so that the conductive contact portion 31 is more closely connected to the mating plug-in terminal 50, thereby improving the electrical conduction performance.

As illustrated in FIG. 2, the connection arms 20 on two sides of the same plugging groove 23 are respectively provided with the conductive contact portions 31. In an embodiment, the connection arms 20 on two sides of the same plugging groove 23 are disposed to be opposite to each other, so that the mating plug-in terminal 50 is more closely connected to the plug-in terminal. In another embodiment, the connecting arms 20 on two sides of the same plugging groove 23 are disposed to be staggered, which is beneficial to increasing the contact area between the mating plug-in terminal 50 and the plug-in terminal.

Figure 3:
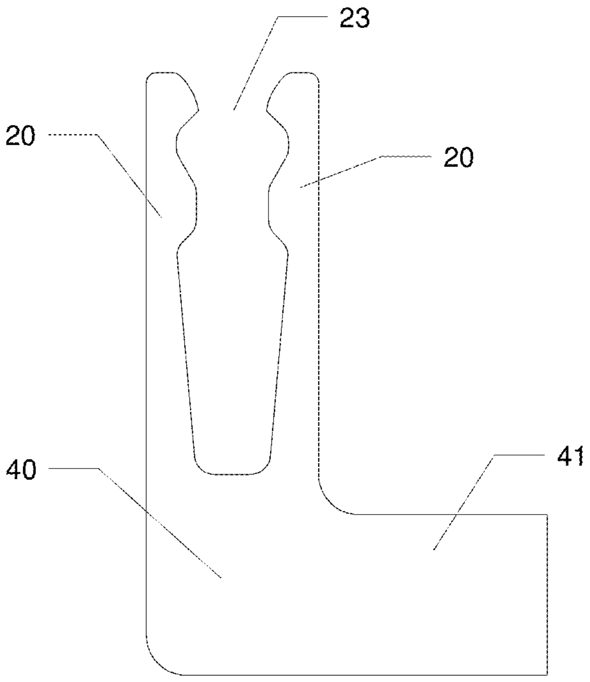
FIGS. 3 to 5 illustrate schematic diagrams of structures of a terminal lamination in a plug-in terminal according to the present disclosure.
Figure 4:
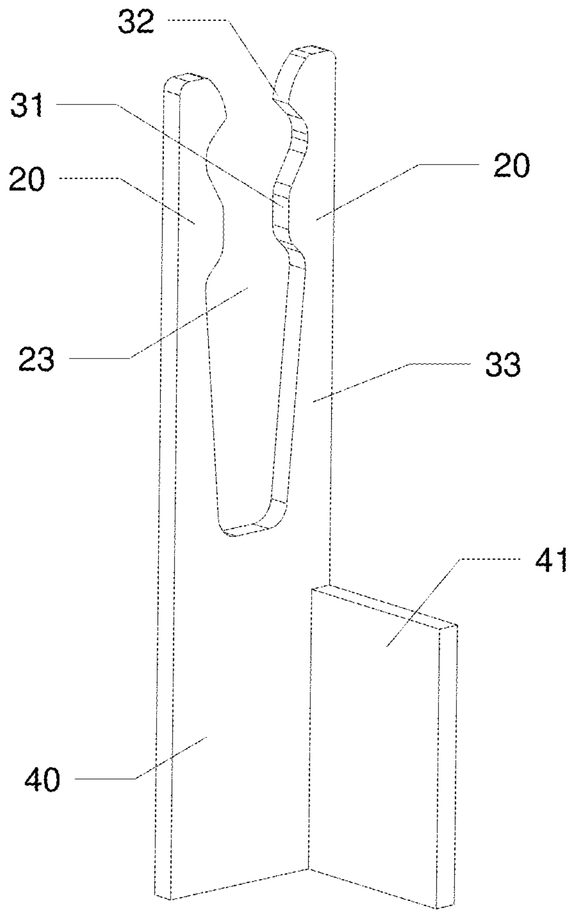
Figure 5:
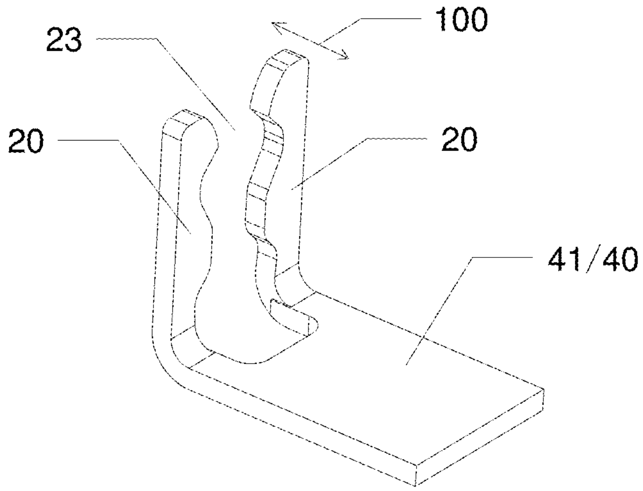
Figure 6:
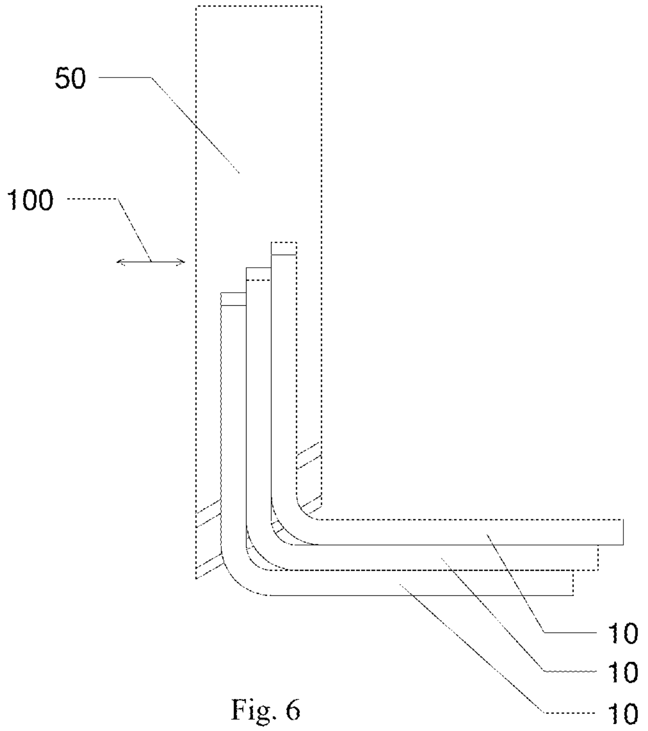
FIGS. 6 to 7 illustrate schematic diagrams of plugging between a plug-in terminal and a mating plug-in terminal according to another embodiment of the present disclosure.
Figure 7:
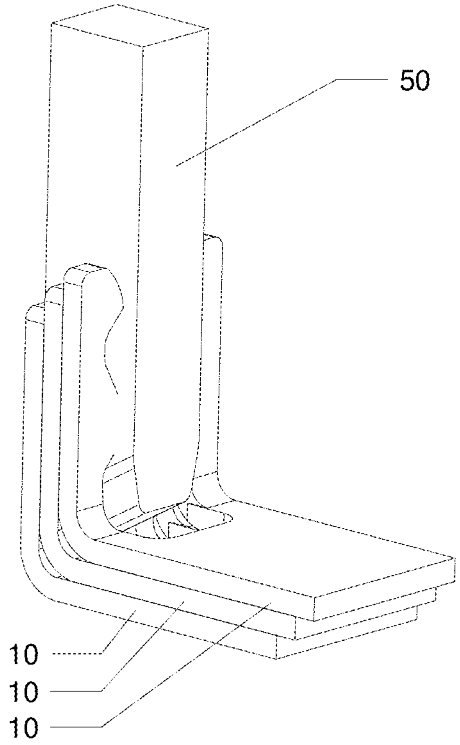

Further, the terminal fixing portion 40 has a bending extension portion 41 disposed in a plane or a non-plane with a bending angle of 0° to 180°, so as to adapt to different wiring directions. As illustrated in FIGS. 3 to 7, the terminal fixing portion 40 includes a body portion and a bending extension portion 41, and the terminal fixing portion 40 may be punched or cut to form a plurality of angles between the body portion and the bending extension portion 41. As illustrated in FIG. 3, the bending extension portion 41 and the body portion are in the same plane, and the bending angle between their extending directions is exemplarily 90°. As illustrated in FIGS. 4 and 5 to 7, the bending extension portion 41 and the body portion are not in the same plane, and the bending extension portion 41 is bent and extended in a non-plane, and the bending angle between their extension directions is exemplarily 90°.

In some embodiments, the material of the terminal lamination 10 includes tellurium, and the body material of the terminal lamination 10 is tellurium-copper alloy, so that the terminal has a good electrical conductivity and machinability, thus ensuring the electrical performance and also improving the processability.

Further, the content of tellurium in the material of the terminal lamination 10 is 0.1% to 5% to ensure the electrical conductivity, and the elasticity of the tellurium copper alloy is also excellent. Exemplarily, the content of tellurium in the tellurium copper alloy is 0.2% to 1.2%.

The inventor selects ten terminal laminations 10 with the same shape and the same size for testing, and the number of the terminal laminations 10 in the plug-in terminals are equal. The body material of each of the terminal laminations 10 is the copper telluride alloy, in which the tellurium content of tellurium accounts for 0.05%, 0.1%, 0.2%, 0.5%, 0.8%, 1.2%, 2%, 3%, 5%, 6% and 7%, respectively. After the mating plug-in terminal and the plug-in terminal are plugged together and the plug-in structure is electrified, the electrical conductivity of the corresponding plugging position is detected, and the test results are shown in Table 2.

In this embodiment, the electrical conductivity greater than 99% is an ideal value.

TABLE 2

Influences of Tellurium Copper Alloys with Different Tellurium Contents on the Electrical Conductivity

| Tellurium content (%) | 0.05 | 0.1 | 0.2 | 0.5 | 0.8 | 1.2 | 2 | 3 | 5 | 6 | 7 |
|---|---|---|---|---|---|---|---|---|---|---|---|
| Electrical conductivity (%) | 98.3 | 99.2 | 99.7 | 99.8 | 99.8 | 99.7 | 99.6 | 99.5 | 99.4 | 98.9 | 98.5 |

As can be seen from Table 2, when the tellurium content is less than 0.1% or greater than 5%, the electrical conductivity decreases obviously, which cannot meet the requirements of the ideal value. When the tellurium content is greater than or equal to 0.2% and less than or equal to 1.2%, the electrical conduction performance is the best. When the tellurium content is greater than 1.2% and less than or equal to 5%, although the electrical conductivity meets the requirements of the ideal value, the trend is to gradually decrease and the electrical conduction performance will also decrease. Therefore, the inventor selects the tellurium copper alloy with a tellurium content of 0.1% to 5%. In the most ideal case, the tellurium copper alloy with a tellurium content of 0.2% to 1.2% is selected.

In some embodiments, the body material of the terminal lamination 10 includes beryllium. The material of the terminal lamination 10 is beryllium copper alloy, so that the terminal lamination 10 has high hardness, elastic limit, fatigue limit and wear resistance, and also has a good corrosion resistance, thermal conductivity and electrical conductivity, and does not generate sparks when being impacted.

Further, the content of beryllium in the body material of a micro-vibration terminal is 0.05% to 5%.

Further, the content of beryllium in the body material of a micro-vibration terminal is 0.1% to 3.5%.

In order to verify the influence of the beryllium content on the electrical conductivity of the terminal, the inventor selects 10 terminal laminations 10 with the same shape and the same expansion joint width for testing, and each of the terminals includes beryllium, and the beryllium content accounts for 0.03%, 0.05%, 0.1%, 0.2%, 1%, 1.2%, 1.8%, 3%, 3.5%, 5% and 6% respectively. The test results are shown in Table 3.

TABLE 3

Influences of Different Beryllium Contents on the Electrical Conductivity

| Beryllium content | 0.03% | 0.05% | 0.1% | 0.2% | 1% | 1.2% | 1.8% | 3% | 3.5% | 5% | 6% |
|---|---|---|---|---|---|---|---|---|---|---|---|
| Electrical conductivity | 98.9% | 99.2% | 99.5% | 99.6% | 99.8% | 99.8% | 99.6% | 99.3% | 99.3% | 99.2% | 98.6% |

As can be seen from Table 3, when the beryllium content is less than 0.05% or greater than 5%, the electrical conductivity decreases obviously, which cannot meet the actual demand. When the beryllium content is greater than or equal to 0.1% and less than or equal to 3.5%, the electrical conduction performance is the best. Therefore, the inventor selects the terminal lamination 10 with a beryllium content of 0.05% to 5%. Exemplarily, the terminal lamination 10 with a beryllium content of 0.1% to 3.5% is selected in the most ideal case.

In some embodiments, at least part of the surface of the terminal lamination 10 is provided with a plating layer, so as to increase the corrosion resistance, the electrical conductivity and the number of times of plugging, thereby better prolonging the service life of the plug-in structure. In an embodiment, the surface of the conductive contact portion 31 is provided with the plating, and the plating layer on a surface of the conductive contact portion is a first plating layer.

In an embodiment, a surface of the scraping portion 32 is provided with the plating layer, and the plating layer on the surface of the scraping portion is a second plating layer.

In an embodiment, a surface of the connection arm 20 exclusive of the conductive contact portion 31 and the scraping portion 32 is provided with the plating layer, and the plating layer on the surface of the connection arm exclusive of the conductive contact portion and the scraping portion is a third plating layer.

In an embodiment, a surface of the terminal fixing portion 40 is provided with the plating layer, and the plating layer on the surface of the terminal fixing portion is a fourth plating layer.

Further, materials of the first plating layer, the second plating layer, the third plating layer and the fourth plating layer are different, i.e., the material of at least one of the first plating layer, the second plating layer, the third plating layer and the fourth plating layer is different from the others, and it may be the following situations:

the material of the first plating layer is different from that of the other three plating layers which are made of a same material; or, the material of the second plating layer is different from that of the other three plating layers which are made of a same material; or, the material of the third plating layer is different from that of the other three plating layers which are made of a same material; or, the material of the fourth plating layer is different from that of the other three plating layers which are made of a same material. It may also be the following situations, the material of the first plating layer is the same as that of the second plating layer, the material of the third plating layer is the same as that of the fourth plating layer, and the material of the first plating layer is different from that of the third plating layer; or, the material of the first plating layer is the same as that of the third plating layer, the material of the second plating layer is the same as that of the fourth plating layer, and the material of the first plating layer is different from that of the second plating layer; or, the material of the first plating layer is the same as that of the fourth plating layer, the material of the second plating layer is the same as that of the third plating layer, and the material of the first plating layer is different from that of the second plating layer.

Further, thicknesses of the first plating layer, the second plating layer, the third plating layer and the fourth plating layer are different, i.e., the thickness of at least one of the first plating layer, the second plating layer, the third plating layer and the fourth plating layer is different from the others, and it may be the following situations:

the thickness of the first plating layer is different from that of the other three plating layers which have a same thickness; or, the thickness of the second plating layer is different from that of the other three plating layers which have a same thickness; or, the thickness of the third plating layer is different from that of the other three plating layers which have a same thickness; or, the thickness of the fourth plating layer is different from that of the other three plating layers which have a same thickness. It may also be the following situations, the thickness of the first plating layer is the same as that of the second plating layer, the thickness of the third plating layer is the same as the thickness of the fourth plating layer, and the thickness of the first plating layer is different from that of the third plating layer; or, the thickness of the first plating layer is the same as that of the third plating layer, the thickness of the second plating layer is the same as the thickness of the fourth plating layer, and the thickness of the first plating layer is different from that of the second plating layer; or, the thickness of the first plating layer is the same as that of the fourth plating layer, the thickness of the second plating layer is the same as the thickness of the third plating layer, and the thickness of the first plating layer is different from that of the second plating layer.

Further, the material of the third plating layer is the same as that of the fourth plating layer, and the material of the first plating layer or the second plating layer is different from that of the third plating layer, i.e., the material of the first plating layer is different from that of the third plating layer, or the material of the second plating layer is different from that of the third plating layer.

Further, the thickness of the third plating layer is the same as that of the fourth plating layer, and the thickness of the first plating layer or the second plating layer is different from that of the third plating layer, i.e., the thickness of the first plating layer is different from that of the third plating layer, or the thickness of the second plating layer is different from that of the third plating layer.

It should be noted that the plating layers of different metal materials have different electrical conduction effects and corrosion resistances. A plating layer of a metal material with a high price achieves a better electrical conduction effect and corrosion resistance, and is capable of being subjected to plugging and unplugging for more times and used in a more complex environment to obtain a longer service life. However, the high price limits the use of such plating layer. Therefore, the inventor uses a metal material such as gold, silver, silver-antimony alloy, graphite silver, graphene silver, palladium-nickel alloy, tin-lead alloy or silver-gold-zirconium alloy, which has excellent properties but a high price, as the material of the plating layer at a position subjected to frequent plugging and unplugging or exposed in the use environment, and instead, selects a material with a low price as the material of the plating layer at a position subjected to infrequent plugging and infrequent unplugging or unlike to be exposed. For example, the conductive contact portion 31 is provided with a metal having a good electrical conduction effect and corrosion resistance but a high price as the material of the plating layer, and the terminal fixing portion 40 is provided with a material having a low price as the material of the plating layer.

It should be noted that some areas of the terminal lamination 10 are subjected to plugging and unplugging frequently and will be exposed to the use environment, so the plating layers will be scraped, and corroded by the external environment. If the plating layers are thin, they will be easily scraped out or corroded off during use. Therefore, the inventor disposes thicker plating layers at these positions (e.g., the conductive contact portion 31 and the scraping portion 32) to improve the scrape resistance and the corrosion resistance of the plug-in terminal. Meanwhile, as other areas (e.g., the terminal fixing portion 40) are not scraped or exposed to the use environment, thinner plating layers may be used to reduce the cost.

In an embodiment, the plating layer may be disposed on the terminal lamination 10 by electroplating, chemical plating, magnetron sputtering, vacuum plating or the like. The electroplating is a process of plating a thin layer of other metal or alloy on a metal surface by using a principle of electrolysis. The chemical plating is a deposition process in which a metal is produced through a controllable oxidation-reduction reaction under a metal catalytic action. The magnetron sputtering is to use an interaction of a magnetic field and an electric field to make electrons move spirally near a target surface, thereby increasing the probability that electrons bombard argon to generate ions, and the generated ions bombard the target surface under the action of the electric field so as to sputter a target material. The vacuum plating is to deposit various metal films and non-metal films on the surface of parts by means of distillation or sputtering under vacuum conditions.

In an embodiment, the material of the plating layer includes one or more selected from gold, silver, nickel, tin, zinc, tin-lead alloy, silver-antimony alloy, palladium, palladium-nickel alloy, graphite silver, graphene silver and silver-gold-zirconium alloy. As an active metal, copper will react with oxygen and water during use, so one or more inactive metals are needed as the plating layer to prolong the service life of the plug-in terminal. In addition, for a metal contact point subjected to plugging and unplugging frequently, a metal with good wear resistance is also needed as the plating layer, thereby greatly prolonging the service life of the contact point. Moreover, the contact point requires a good electrical conduction performance, and the above metals have a better electrical conductivity and stability than copper or copper alloy, so that the plug-in terminal can obtain a better electrical performance and a longer service life.

a corrosion area of the surface of the plug-in terminal is more than 10% of a total area thereof, and then record the number of cycles at that time. In this embodiment, when the number of cycles is less than 80, it is considered as unqualified.

As can be seen from Table 4, when a material of the plating layer includes the conventional metals such as tin, nickel and zinc, the experimental results are not as good as those of other metals. The nickel-plated layers are qualified in the experiment of the number of times of plugging and unplugging, but are not so excellent, and are all qualified in the salt spray experiment. However, the experimental results of other metals largely exceed the standard value, and the performances are stable. Thus, the inventor selects that the material of the plating layer includes one or more selected from gold, silver, nickel, tin, zinc, tin-lead alloy, silver-antimony alloy, palladium, palladium-nickel alloy, graphite silver, graphene silver and silver-gold-zirconium alloy.

TABLE 4

Influences of Different Materials of Plating Layer on the Number of Times of Plugging and Unplugging and Corrosion Resistance of Terminals

| Different materials of plating layer | | | | | | | | | | | |
|---|---|---|---|---|---|---|---|---|---|---|---|
| Gold | Silver | Silver-antimony alloy | Graphite silver | Graphene silver | Silver-gold-zirconium alloy | Tin | Nickel | Palladium | Palladium-nickel alloy | Tin-lead alloy | Zinc |
| Number of times of plugging and unplugging | | | | | | | | | | | |
| 12400 | 11800 | 12200 | 12000 | 12700 | 12100 | 8600 | 8400 | 12000 | 12000 | 11000 | 8600 |
| Number of cycles of corrosion resistance tests | | | | | | | | | | | |
| 131 | 128 | 122 | 130 | 16 | 131 | 83 | 89 | 111 | 122 | 109 | 88 |

In order to verify the influences of different materials of the plating layer on the overall performance of the plug-in terminals, the inventor adopts plug-in terminal samples of the same specification, the same material, and having plating layers of different materials, to carry out a series of tests on the number of times of plugging and unplugging and the corrosion resistance time by using aluminum busbar of the same specification. In order to prove the advantages and disadvantages of the selected materials and other conventional plating materials, the inventor also selects tin, nickel and zinc as the materials of the plating layers for experiment. The experimental results are shown in Table 4.

The number of times of plugging and unplugging in Table 4 is obtained as follows: the plug-in terminals are fixed on an experimental platform respectively; a mechanical device is used to simulate the plugging and unplugging of the aluminum busbar; after every 100 times of plugging and unplugging, it is necessary to stop and observe the damage of the plating layer on the surface of each plug-in terminal; if the plating layer on the surface of the terminal is scraped and the material of the terminal itself is exposed, the experiment is stopped, and then the number of times of plugging and unplugging at that time is recorded. In this embodiment, when the number of times of plugging and unplugging is less than 8000, it is considered as unqualified.

The test on the corrosion resistance time in Table 4 is to put a plug-in terminal into a salt spray test chamber, spray salt fog for each position on the plug-in terminal, take out and clean the plug-in terminal every 20 hours to observe corrosion on the surface, which is a cycle, stop the test when In some embodiments, the plating layer includes a bottom layer and a surface layer, and is formed by a multi-layer plating method. After the terminal lamination 10 is processed, there are still many cracks and holes under a surface micro-interface, which are the main reasons for the wearing and corrosion of the terminal lamination 10 during use. In this embodiment, a bottom layer is firstly plated on the surface of the terminal lamination 10 to fill the cracks and holes on the surface, so that the surface of the terminal lamination 10 is smooth and free of cracks and holes, and then a surface layer is plated, so that the binding is firmer and smoother, and the plated surface is free of cracks and holes. As a result, the wear resistance, the corrosion resistance and the electrical performance of the plug-in terminal are better, and the service life of the plug-in terminal is greatly prolonged.

In another embodiment, the material of the bottom layer includes one or more selected from gold, silver, nickel, tin, tin-lead alloy and zinc; and the material of the surface layer includes one or more selected from gold, silver, nickel, tin, zinc, tin-lead alloy, silver-antimony alloy, palladium, palladium-nickel alloy, graphite silver, graphene silver and silver-gold-zirconium alloy.

In another embodiment, the bottom layer has a thickness of 0.01 μm to 12 μm, and exemplarily a thickness of 0.1 μm to 9 μm.

In another embodiment, the surface layer has a thickness of 0.5 μm to 50 μm, and exemplarily a thickness of 1 μm to 35 μm.

In order to verify the influence of the change of the thickness of the bottom layer of the plating layer on the overall performance of the plug-in terminal, the inventor adopts plug-in terminals of the same specification, the same material, having nickel-plated bottom layers of different thicknesses, and having silver-plated surface layers of a same thickness, to carry out a series of tests on the temperature rise and the corrosion resistance time by using the mating plug-in terminals 50 of the same specification. The experimental results are shown in Table 5 below.

The test on the temperature rise in Table 5 is to conduct the same current to the plug-in structures, detect the temperatures of the plug-in terminal at the same position before the current conduction and after the temperature is stable in a closed environment, and take a difference therebetween to obtain an absolute value. In this embodiment, when the temperature rise is greater than 50K, it is considered as unqualified.

TABLE 5

Influences of Different Thicknesses of Bottom Layer of Plating Layer on Temperature Rise and Corrosion Resistance

| | | | | | | | | |
|---|---|---|---|---|---|---|---|---|
| Different thicknesses of nickel-plated bottom layer (μm) | | | | | | | | |
| 0.001 | 0.005 | 0.01 | 0.05 | 0.1 | 0.5 | 1 | 3 | 5 |
| Temperature rise of plug-in terminal (k) | | | | | | | | |
| 10.0 | 12.2 | 14.9 | 16.1 | 18.2 | 21.7 | 24.4 | 26.6 | 28.6 |
| Number of cycles of corrosion resistance tests | | | | | | | | |
| 68 | 78 | 84 | 93 | 103 | 109 | 113 | 115 | 120 |
| Different thicknesses of nickel-plated bottom layer (μm) | | | | | | | | |
| 6 | 9 | 10 | 11 | 12 | 13 | 15 | | |
| Temperature rise of plug-in terminal (k) | | | | | | | | |
| 31.1 | 35.7 | 40.1 | 43.5 | 44.8 | 56.3 | 60.4 | | |
| Number of cycles of corrosion resistance tests | | | | | | | | |
| 122 | 128 | 128 | 130 | 130 | 129 | 127 | | |

The test on the corrosion resistance time in Table 5 is to put a plug-in terminal into a salt spray test chamber, spray salt fog for each position on the plug-in terminal, take out and clean the plug-in terminal every 20 hours to observe corrosion on the surface, which is a cycle, stop the test when a corrosion area of the surface of the plug-in terminal is more than 10% of a total area thereof, and then record the number of cycles at that time. In this embodiment, when the number of cycles is less than 80, it is considered as unqualified.

As can be seen from Table 5, although the temperature rise of the plug-in structure is qualified when the thickness of the nickel-plated bottom layer is less than 0.01 μm, the number of cycles of corrosion resistance tests of the plug-in terminal is less than 80 since the bottom layer is too thin, and the performance requirement of the plug-in terminal cannot be met, which greatly affects the overall performance and the service life of the plug-in structure, and in severe cases, causes the product service life to be reduced sharply or even a failure that leads to burning accidents. When the thickness of the nickel-plated bottom layer is greater than 12 μm, the heat generated by the plug-in structure cannot be radiated since the bottom layer is thick, which makes the temperature rise of the plug-in structure unqualified, and the plating layer with the thick bottom layer is easy to fall off the surface of the terminal lamination 10, resulting in a decrease in the number of cycles of the corrosion resistance. Thus, the inventor selects the thickness of the bottom layer to be 0.01 μm to 12 μm.

Exemplarily, the inventor finds that the comprehensive effect of the temperature rise and the corrosion resistance of the plug-in structure is better when the thickness of the bottom layer of the plating layer is 0.1 μm to 9 μm. Therefore, in order to further improve the safety, reliability and practicability of the product itself, it is exemplarily that the thickness of the bottom layer of the plating layer is 0.1 μm to 9 μm.

In order to verify the influence of the change of the thickness of the surface layer of the plating layer on the overall performance of the plug-in structure, the inventor adopts plug-in terminal samples of the same specification, the same material, having nickel-plated bottom layers of the same thickness, and having silver-plated surface layers of different thicknesses, to carry out a series of tests on the temperature rise and the corrosion resistance time by using the mating plug-in terminals of the same specification. The experimental method is the same as that described above, and the experimental results are shown in Table 6 below.

TABLE 6

Influences of Different Thicknesses of Surface Layer of Plating Layer on Temperature Rise and Corrosion Resistance

| | | | | | | | | |
|---|---|---|---|---|---|---|---|---|
| Different thicknesses of silver-plated surface layer (μm) | | | | | | | | |
| 0.1 | 0.5 | 1 | 1.5 | 5 | 10 | 15 | 20 | 25 |
| Temperature Rise of plug-in terminal (k) | | | | | | | | |
| 11.4 | 13.8 | 15.2 | 17.5 | 21.8 | 23.7 | 25.4 | 28.6 | 31.5 |
| Number of Cycles of Corrosion Resistance Tests | | | | | | | | |
| 75 | 81 | 91 | 93 | 95 | 97 | 98 | 102 | 105 |
| Different thicknesses of silver-plated surface layer (μm) | | | | | | | | |
| 30 | 35 | 40 | 45 | 50 | 55 | 60 | 65 | |
| Temperature Rise of plug-in terminal (k) | | | | | | | | |
| 35.6 | 39 | 42.5 | 45.4 | 48.2 | 52.5 | 53.8 | 69.3 | |
| Number of Cycles of Corrosion Resistance Tests | | | | | | | | |
| 111 | 112 | 116 | 117 | 122 | 125 | 124 | 121 | |

As can be seen from Table 6, although the temperature rise of the plug-in structure is qualified when the thickness of the silver-plated surface layer is less than 0.5 μm, the number of cycles of corrosion resistance of the plug-in terminal is less than 80 since the surface layer is too thin, and the performance requirement of the plug-in terminal cannot be met, which greatly affects the overall performance and the service life of the plug-in structure, and in severe cases, causes the product service life to be reduced sharply or even a failure leading to burning accidents. When the thickness of the silver-plated surface layer is greater than 50 μm, the heat generated by the plug-in terminal cannot be radiated since the surface layer is thick, which makes the temperature rise unqualified, and the plating layer with the thick surface layer is easy to fall off the surface of the terminal, resulting in a decrease in the number of cycles of the corrosion resistance tests. Moreover, since the surface layer is made of precious metal, the plating layer with the thick surface layer does not improve the performance and has no use value. Thus, the inventor selects the thickness of the silver-plated surface layer to be 0.1 μm to 50 μm. Exemplarily, the inventor finds that the comprehensive effect of the temperature rise and the corrosion resistance of the terminal is better when the thickness of the surface layer of the plating layer is 1 μm to 35 μm. Therefore, in order to further improve the safety, reliability and practicability of the product itself, it is exemplary that the thickness of the surface layer of the plating layer is 1 μm to 35 μm.

In some exemplary embodiments, the material of the plating layer on the overhanging end 21 is different from that of the plating layer on the fixed end 22. As can be seen from the above description, the plating layers of different metal materials achieve different electrical conduction effects and corrosion resistances. A plating layer of a metal material with a high price achieves a better electrical conduction effect and corrosion resistance, and is capable of being subjected to plugging and unplugging for more times and used in a more complex environment to obtain a longer service life. However, the high price limits the use of such plating layer. Therefore, the inventor uses a metal material such as gold, silver, silver-antimony alloy, graphite silver, graphene silver, palladium-nickel alloy, tin-lead alloy and silver-gold-zirconium alloy, which has excellent properties but a high price, as the material of the plating layer at a position subjected to frequent plugging and unplugging or exposed in the use environment. However, the fixed end 22 is at the position where the wires are connected, and there is substantially no relative displacement after being connected to the wires, and the fixed end 22 is generally protected in a molded housing and will not be exposed to the use environment, so the inventor uses the conventional metal such as tin, nickel or zinc as the material of the plating layer of the fixed end 22 to reduce the cost of the connection structure.

In an exemplary embodiment, a ratio of a minimum width of the connection arm 20 to a thickness thereof is 0.5 to 10. The terminal lamination 10 is capable of being plugged with the mating plug-in terminal 50 only when the terminal lamination 10 is elastic, and there is a practical use value only when the ratio of the width of the connection arm 20 of the terminal lamination 10 to the thickness thereof does not exceed a certain range. Because when the ratio is too large, i.e., the thickness is too small, the overall strength of the terminal lamination 10 is too small, and more terminal laminations 10 are required to meet the actual needs, which means that more working time is required; and when the ratio is too small, i.e., the thickness is too large, the terminal lamination 10 will not be easily deformed, which affects the plugging with the mating plug-in terminal 50.

In order to verify the influence of the ratio of the minimum width of the connection arm 20 to the thickness thereof on the use of the terminal, the inventor conducts tests in the following method: the inventor selects the same mating plug-in terminal 50 and different terminal laminations 10, in which the terminal laminations 10 have the connection arms 20 with the same width and different thicknesses, and different terminal laminations 10 are used for plugging test with the mating plug-in terminal 50. If the connection arm 20 is too thick to realize plugging, or the connection arm 20 is too thin and leads to an irreversible deformation, it is considered as unqualified and otherwise qualified. The results are shown in Table 7.

As can be seen from Table 7, when the ratio of the minimum width of the connection arm 20 to the thickness thereof is less than 0.5, the connection arm 20 will be deformed during plugging, resulting in the abandonment of the terminal lamination 10; and when the ratio of the minimum width of the connection arm 20 to the thickness of the connection arm 20 is greater than 10, it is impossible for plugging, so the inventor selects that the ratio of the minimum width of the connection arm 20 to the thickness thereof is 0.5 to 10.

TABLE 7

Influences of Different Ratios of Minimum Width Connection Arm to Thickness thereof on Terminal Plugging

| Ratio of Minimum Width Connection Arm to Thickness thereof | | | | | | | | | |
|---|---|---|---|---|---|---|---|---|---|
| 0.1 | 0.3 | 0.5 | 1 | 3 | 5 | 7 | 10 | 11 | 12 |
| Whether plugging can be made | | | | | | | | | |
| Yes | Yes | Yes | Yes | Yes | Yes | Yes | Yes | No | No |
| Whether deformation occurs | | | | | | | | | |
| Yes | Yes | No | No | No | No | No | No | No | No |

In some exemplary ways, the gap between the connection arms of adjacent two of the terminal laminations 10 is less than 0.2 mm. One purpose of providing the gap between terminal laminations 10 is to make air circulate between the adjacent connection arms 20, so as to reduce the temperature rise between the mating plug-in terminal 50 and the plug-in terminal, protect the plating layer and prolong the service life of the plug-in structure. Another purpose is to release the elasticity of the connection arms 20 themselves, and ensure the clamping force between the opposite connection arms 20, thereby ensuring the plugging force. However, the gap between the adjacent connection arms 20 is not the larger the better, because when the gap between the connection arms 20 of adjacent two of the terminal laminations is greater than 0.2 mm, the heat dissipation function is not improved and the connection arms 20 with the same contact area occupy a larger width and waste the use space. In addition, since the terminal fixing portions are attached together, the connection arm 20 with the same contact area will consume more volume of the mating plug-in terminal 50, thereby increasing the consumption of the terminal and the cost of the plug-in structure.

In some embodiments, at least part of the connection arm 20 is made of a memory alloy. The memory alloy is an intelligent metal with a memory ability, and its microstructure has two relatively stable states; the memory alloy may be changed into any desired shape at a high temperature and may be stretched at a low temperature; when being reheated, the memory alloy will remember its original shape and change back; the memory alloy have different crystal structures above its transition temperature and below its transition temperature, and when the temperature changes around the transition temperature, the memory alloy will contract or expand, thereby causing a change of its morphology.

In some embodiments, the transition temperature of the memory alloy is 40° C. to 70° C. When the temperature of the connection arms 20 is lower than the transition temperature, a plurality of connection arms 20 are in an expanded state; and when the temperature of the connection arm 20 is higher than the transition temperature, a plurality of connection arms are in a clamped state.

Generally, the transition temperature is selected from 40° C. to 70° C., because if the transition temperature is lower than 40° C., the ambient temperature of the plug-in terminal will be close to 40° C. without current conduction. At this time, the plurality of connection arms 20 is in a clamped state, the plugging groove of the plug-in terminal is narrowed, and the aluminum busbar cannot be plugged there-into, so that the aluminum busbar cannot be plugged with the plug-in structure of the terminal, and the working cannot be carried out.

At room temperature, current starts to be conducted after the plug-in terminal is plugged with the mating plug-in terminal 50. Since the plurality of connection arms 20 are in an expanded state at the beginning of plugging, the contact area between the plug-in terminal and the mating plug-in terminal 50 is small and the current is large, which leads to the temperature rise of the connection arm 20 after plugging. If the transition temperature is higher than 70° C., the time of the temperature rise of the terminal is long, and large current flows through the plug-in structure of the plug-in terminal and the mating plug-in terminal 50 for a long time, which easily leads to electrical aging, and in severe cases damages may occur due to the overload to cause unnecessary losses.

Therefore, in general, the transition temperature of the memory alloy is set to be 40° C. to 70° C.

Solution 2

The present invention further provides a plug-in structure, including the aforementioned plug-in terminal and a mating plug-in terminal 50 plugged therewith.

Further, a plugging force between the plug-in terminal and the mating plug-in terminal 50 is 3 N to 150 N.

Further, a plugging force between the plug-in terminal and the mating plug-in terminal 50 is 10 N to 95 N.

In order to verify the influence of the plugging force between the plug-in terminal and the mating plug-in terminal 50 on the contact resistance therebetween and the plugging situation, the inventor selects the plug-in terminal and the mating plug-in terminal 50 which have the same shape and the same size, and designs different plugging force between the plug-in terminal and the mating plug-in terminal 50 to observe the contact resistance therebetween and the situation after multiple plugging.

The detection method of the contact resistance is to use a micro-resistance measurement instrument to measure the resistance at a position where the plug-in terminal and the mating plug-in terminal 50 are contacted, and read the value on the micro-resistance measurement instrument. In this embodiment, the contact resistance less than 50μΩ is an ideal value.

The test method of the plugging situation of the plug-in terminal and mating plug-in terminal 50 is to perform 50 times of plugging between the plug-in terminal and the mating plug-in terminal 50, and observe the number of times of drops after plugging and unplugging and the number of times of incapability of plugging and unplugging. The number of times of drops after plugging and unplugging should be less than 3, and the number of times of incapability of plugging and unplugging should be less than 5.

TABLE 8

Influence of Different Plugging Forces between Plug-in Terminal and Mating Plug-in Terminal on Contact Resistance and Plugging Situation

| | | | | | | | | | | | | | | |
|---|---|---|---|---|---|---|---|---|---|---|---|---|---|---|
| Plugging force between plug-in terminal and mating plug-in terminal (N) | 1 | 3 | 10 | 15 | 25 | 35 | 45 | 55 | 75 | 95 | 110 | 130 | 150 | 160 |
| Contact Resistance (μΩ) | 62 | 49 | 44 | 42 | 38 | 35 | 30 | 26 | 22 | 18 | 14 | 12 | 8 | 6 |
| Number of times of drops after plugging and unplugging | 4 | 2 | 0 | 0 | 0 | 0 | 0 | 0 | 0 | 0 | 0 | 0 | 0 | 0 |
| Number of times of incapability of plugging and unplugging | 0 | 0 | 0 | 0 | 0 | 0 | 0 | 0 | 0 | 0 | 2 | 3 | 4 | 8 |

As can be seen from Table 8, when the plugging force between the plug-in terminal and the mating plug-in terminal 50 is less than 3 N, the contact resistance therebetween is higher than an ideal value because the bonding force is too small. Meanwhile, the number of drops after plugging and unplugging is more than 3, which is unqualified. When the plugging force between the plug-in terminal and the mating plug-in terminal 50 is greater than 150 N, the number of times of incapability of plugging and unplugging therebetween is more than 5, which is also unqualified. Therefore, the inventor sets the plugging force between the plug-in terminal and the mating plug-in terminal 50 to be 3 N to 150 N.

As can be seen from Table 8, when the plugging force between the plug-in terminal and the mating plug-in terminal 50 is 10 N to 95 N, there is neither a drop after plugging and unplugging nor a situation of incapability of plugging and unplugging, and the contact resistance is also within the range of the ideal value. Therefore, the inventor exemplarily sets the plugging force between the plug-in terminal and the mating plug-in terminal 50 to be 10 N to 95 N.

In some embodiments, the contact resistance between the plug-in terminal and the mating plug-in terminal 50 is less than 9 mΩ. Generally, it is necessary to conduct a large current. If the contact resistance between the plug-in terminal and the mating plug-in terminal 50 is greater than 9 mΩ, a large temperature rise occurs at the contact position, and the temperature becomes increasingly higher as time elapses. Since the plug-in terminal and the mating plug-in terminal 50 have different coefficients of thermal expansion due to different materials thereof, their mechanical deformations are unsynchronized that leads to an internal stress, and in severe cases, the plating layer will fall off and cannot realize the protection. Meanwhile, the excessive temperature of the plug-in terminal and the mating plug-in terminal 50 may be conducted to an insulation layer of the wire connected thereto, so that the insulation layer is melt and cannot realize insulation protection, and in severe cases, a short circuit may be caused, resulting in a damage to the connection structure and even safety accidents such as burning. Therefore, the inventor sets the contact resistance between the plug-in terminal and the mating plug-in terminal 50 to be less than 9 mΩ.

In order to verify the influence of the contact resistance between the plug-in terminal and the mating plug-in terminal 50 on the temperature rise and the electrical conductivity of the plug-in structure, the inventor selects the same mating plug-in terminal 50, and plug-in terminals with different contact resistances, to test the electrical conductivity and the temperature rise.

The test on the electrical conductivity is to detect the electrical conductivity at a corresponding plugging position after the mating plug-in terminal 50 and the plug-in terminal are plugged together and the plug-in structure is electrified. In this embodiment, the electrical conductivity greater than 99% is an ideal value.

The test on the temperature rise is to conduct the same current to the plug-in structure, detect the temperatures of the plug-in terminal at the same position before the current conduction and after the temperature is stable in a closed environment, and take a difference therebetween to obtain an absolute value. In this embodiment, when the temperature rise is greater than 50K, it is considered as unqualified.

TABLE 9

Influence of Different Contact Resistances Between Plug-in Terminal and Mating Plug-in Terminal on Electrical Conductivity and Temperature Rise

| Contact resistances between plug-in terminal and mating plug-in terminal (mΩ) | | | | | | | | |
|---|---|---|---|---|---|---|---|---|
| 10 | 9 | 8 | 6 | 4 | 3 | 2 | 1 | 0.5 |
| Temperature rise of plug-in structure (k) | | | | | | | | |
| 55 | 48 | 41 | 35 | 29 | 23 | 18 | 14 | 7 |
| Electrical conductivity of plug-in structure (%) | | | | | | | | |
| 98.8 | 99.3 | 99.5 | 99.6 | 99.7 | 99.7 | 99.8 | 99.9 | 99.9 |

As can be seen from Table 9, when the contact resistance between the plug-in terminal and the mating plug-in terminal 50 is greater than 9 mΩ, the temperature rise of the plug-in structure exceeds 50 K and the electrical conductivity of the plug-in structure is less than 99%, which does not meet the standard requirements. Therefore, the inventor sets the contact resistance between the plug-in terminal and the mating plug-in terminal 50 to be less than 9 mΩ.

Solution 3

The present disclosure further provides a motor vehicle, including the aforementioned plug-in terminal.

Solution 4

The present disclosure further provides a motor vehicle, including the aforementioned plug-in structure.

Those described above are merely illustrative specific embodiments of the present disclosure, rather than limiting the scope thereof. Any equivalent change or modification made by those skilled in the art without departing from the concept and principle of the present disclosure should fall within the protection scope of the present disclosure.

The invention claimed is:

1. A plug-in terminal, comprising a terminal lamination, wherein the terminal lamination comprises at least two connection arms, each of the connection arms comprises an overhanging end and a fixed end, the fixed ends of the connection arms are fixedly connected together, and a plugging groove is disposed between adjacent two of the connection arms; and the overhanging end is provided with a conductive contact portion;

wherein the overhanging end is provided with a scraping portion, and the scraping portion and the conductive contact portion are sequentially disposed in a direction from the overhanging end to the fixed end;

wherein at least part of a surface of the terminal lamination is provided with a plating layer; and the conductive contact portion is provided with the plating layer, and the plating layer on a surface of the conductive contact portion is a first plating layer; wherein a surface of the scraping portion is provided with the plating layer, and the plating layer on the surface of the scraping portion is a second plating layer; a surface of the connection arm exclusive of the conductive contact portion and the scraping portion is provided with the plating layer, and the plating layer on the surface of the connection arm exclusive of the conductive contact portion and the scraping portion is a third plating layer; a surface of the terminal fixing portion is provided with the plating layer, and the plating layer on the surface of the terminal fixing portion is a fourth plating layer.

2. The plug-in terminal according to claim 1, wherein the conductive contact portions are disposed inside the plugging groove.

3. The plug-in terminal according to claim 1, wherein the plug-in terminal comprises one of:

the plug-in terminal comprises a plurality of terminal laminations that are stacked; and the connection arms of adjacent two of the terminal laminations are in contact fit.

4. The plug-in terminal according to claim 1, wherein the terminal lamination comprises a terminal fixing portion to which the fixed end of each connection arm is fixedly connected.

5. The plug-in terminal according to claim 1, wherein a length of the scraping portion in the direction from the overhanging end to the fixed end accounts for 3% to 55% of a length of the overhanging end.

6. The plug-in terminal according to claim 1, wherein the plug-in terminal comprises one of:

a body material of the terminal lamination is a tellurium copper alloy;

and a body material of the terminal lamination comprises beryllium.

7. The plug-in terminal according to claim 1, wherein the plug-in terminal comprises one of:

materials of the first plating layer, the second plating layer, the third plating layer and the fourth plating layer are different;

and thicknesses of the first plating layer, the second plating layer, the third plating layer and the fourth plating layers are different.

8. The plug-in terminal according to claim 1, wherein a ratio of a minimum width of the connection arm to a thickness thereof is 0.5 to 10.

9. The plug-in terminal according to claim 1, wherein a gap between the connection arms of adjacent two of the terminal laminations is less than 0.2 mm.

10. The plug-in terminal according to claim 1, wherein at least part of the connection arm is made of a memory alloy;

wherein the memory alloy has a transition temperature of 40° C. to 70° C.; when a temperature of the connection arms is lower than the transition temperature, a plurality of connection arms are in an expanded state; and when the temperature of the connecting arms is higher than the transition temperature, a plurality of connection arms are in a clamped state.

11. A motor vehicle, comprising the plug-in terminal according to claim 1.

12. The plug-in terminal according to claim 1, wherein the plating layer comprises a bottom layer and a surface layer.

13. The plug-in terminal according to claim 12, wherein the plug-in terminal comprises one of:

a thickness of the bottom layer is 0.01 μm to 12 μm;

and a thickness of the surface layer is 0.5 μm to 50 μm.

14. A plug-in structure, comprising the plug-in terminal according to claim 1, and a mating plug-in terminal plugged with the plug-in terminal.

15. The plug-in structure according to claim 14, wherein a plugging force between the plug-in terminal and the mating plug-in terminal is 3 N to 150 N.

16. The plug-in structure according to claim 14, wherein a contact resistance between the plug-in terminal and the mating plug-in terminal is less than 9 mΩ.

17. The plug-in terminal according to claim 1, wherein a highest point of the scraping portion relative to the overhanging end is not higher than a highest point of the conductive contact portion relative to the overhanging end.

18. The plug-in terminal according to claim 17, wherein a cross-section of the conductive contact portion is trapezoidal, a cross-section of the scraping portion is triangular.

* * * * *